United States Patent [19]

Kraker

[11] Patent Number: 4,860,238

[45] Date of Patent: Aug. 22, 1989

[54] DIGITAL SINE GENERATOR

[75] Inventor: Alfred Kraker, Vienna, Austria

[73] Assignee: Siemens Aktiengesellschaft, Berlin and Munich, Fed. Rep. of Germany

[21] Appl. No.: 7,710

[22] Filed: Jan. 28, 1987

[30] Foreign Application Priority Data

Feb. 3, 1986 [AT] Austria .................................. 242/86

[51] Int. Cl.$^4$ .............................................. G06F 3/00
[52] U.S. Cl. .................................................... 364/721
[58] Field of Search ................................ 364/718, 721

[56] References Cited

U.S. PATENT DOCUMENTS 3,597,599  8/1971  Melvin ................................ 235/154

OTHER PUBLICATIONS

M. Cukier, "Programmable Digital Frequency Synthesizer", IBM Technical Disclosure Bulletin, vol. 24, No. 1B, Jun. 1981, pp. 512–513.

Primary Examiner—Gary V. Harkcom
Assistant Examiner—Long T. Nguyen
Attorney, Agent, or Firm—Adel A. Ahmed

[57] ABSTRACT

A digital sine generator for providing fine resolution digital signals, more particularly 16-bit signals, includes a first computer for the selection of argument values and a second computer for the determination of the function values. Equidistant values or equally spaced points are selected as argument values on a periodic zig-zag characteristic so that for the function formation with the sine values in the range of the arguments between $-\pi/2$ and $+\pi/2$ is found to be sufficient. For the calculation of the sine values, a specific 7th order polynomial is used which can be implemented by five successive simple computations as a consequence of optimum selection of the coefficients.

2 Claims, 1 Drawing Sheet

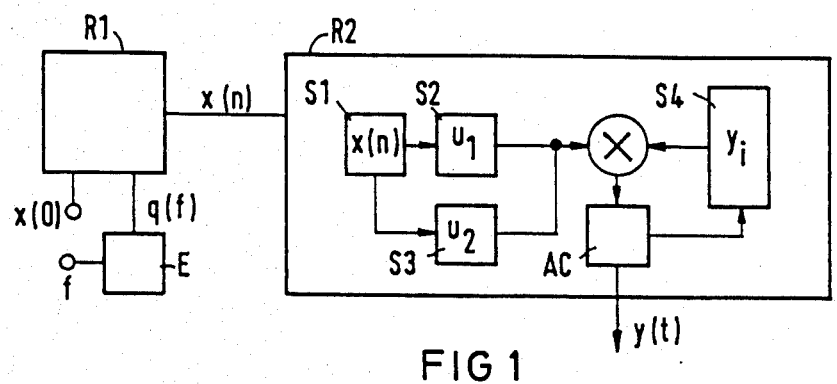
FIG 1
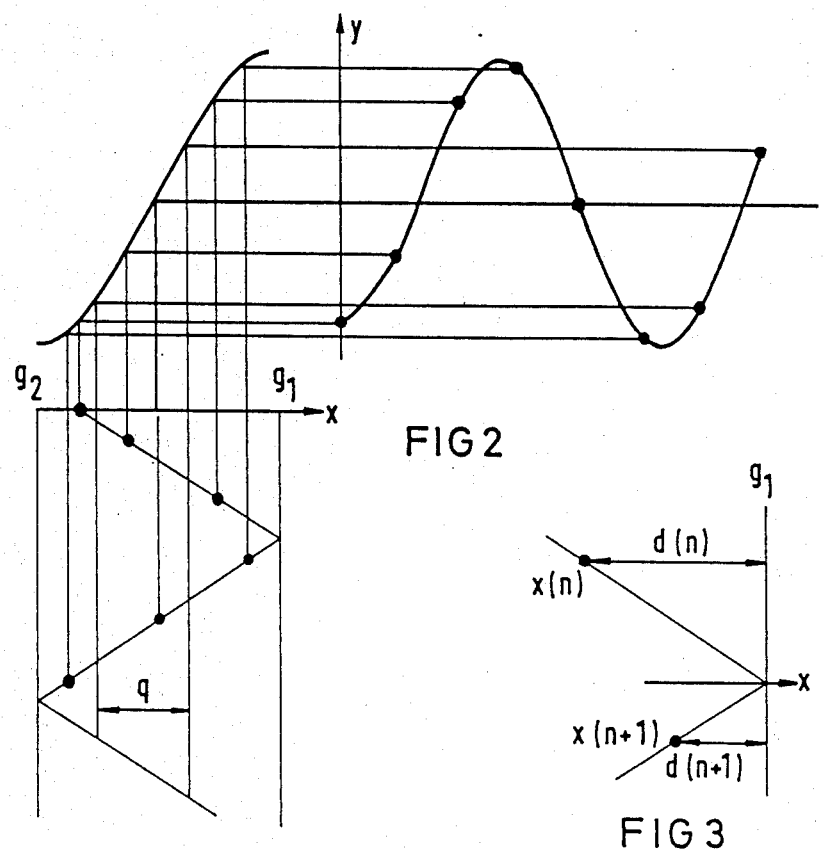
FIG 2
FIG 3

DIGITAL SINE GENERATOR

BACKGROUND OF THE INVENTION

This invention relates to digital sinusoidal generators capable of producing an output of fine resolution digital signals, in particular 16-bit signals. The invention more particularly relates to a generator comprising a first computer for the selection of argument values and a second computer serving for function value formation.

In master control desks for sound studio installations, the required signal processing of signals in analog signal representation has conventionally been performed by means of analog circuit elements. With recent developments toward digital signal processing techniques, it has now become necessary to generate sinusoidal (sine) signals on a digital basis.

In a typical conventional digital tone generator, there are stored in addition to the elements of the definition range of the argument values (x) an address of the sine function values (y=sin x) as data. Therewith a sine sequence is formed by periodical read-out. The disadvantage of this arrangement is that any desired tone frequencies cannot be formed with it, but only those which are in a suitable ratio to the scanning frequency can be produced with this apparatus in a simple manner. Otherwise, time-consuming interpolation processes become necessary, which in turn entail problems of accuracy or precision.

Other solutions do not achieve the 16-bit accuracy required for representation of digital signals for sound studio technology or they require generation times of the individual members of the digital signal sequence too long for practical application.

SUMMARY OF THE INVENTION

It is an object of the present invention to provide a digital sine generator which, inspite of any frequency selected, produces sufficient accuracy for 16-bit signal transmission.

In accordance with the invention this is achieved by a first computer including an input device for the frequency f to be generated by the sine generator which serves to gain a quantization amount proportional to this frequency $q = INT\ (4f/f_s)\ 2^{14}$, whereby $f_s$ is the scanning frequency. The first computer starts from a given initial value $x(0) = INT\ (2\phi/\pi)\ 2^{14}$ and supplies a sequence of arguments $x(n)$ which differ by the quantization amount, lie within the limits $g_1$, $g_2$ of a predetermined argument definition range, and which in periodically sequential scanning sections increase or decrease alternatingly, whereby the sum $d(n) + d(n+1)$ of the differences (e.g., $d(n) = g_1 - x(n)$, $d(n+1) = -(g_1 - x(n+1))$) is between a limit $g_1$ and the two arguments belonging to different scanning sections succeeding each other $x(n)$, $x(n+1)$ equal to the quantization amount q, and that the integer binary argument values differing by the quantization amount q lying stepwise around this amount $x(n) = INT(4f/f_s.n + x(0))\ 2^{14}$ are defined between the upper limit $g_1 = 2^{14}$ and the lower limit $g_2 = -2^{14}$ and that finding the sine function values $y(n) = (\sin\ (2\pi(f/f_s).n + \phi))\ 2^{14}$ is based on the following iterative polynomial formation:

$$y_0 = -142$$

$$y_1 = u_1.y_0.2^{-14} + 2603$$

$$y_2 = u_1.y_1.2^{-14} - 21165$$

$$y_3 = y_2.2^{-1}$$

$$y_4 = u_1.y_3.2^{-14} + 25736$$

$$y = y_5 = u_2.y_4.2^{-14}$$

whereby the expressions $u_1 = INT(x^2)\ 2^{-14}$ and $u_2 = INT\ (x(n))$ "INT" is the largest integer of the argument.

BRIEF DESCRIPTION OF THE DRAWING

Features of the invention and additional objects of the invention will be more readily appreciated and better understood by reference to the following detailed description which should be considered in conjunction with the drawing.

An illustrative embodiment of the present invention is depicted in FIG. 1.

FIGS. 2 and 3 are diagrams for the illustrating aspects of the processes occurring during signal processing.

DETAILED DESCRIPTION

The two computers of which the first is used for the selection of the arguments and the second computer for the formation of the function values are designated R1 and R2 in FIG. 1. These computers do not need to be designed as separate structural units but can also be two arithmetic units of one single computer. It is, however, also possible to have one single computer perform the computing processes of R1 and R2 in staggered computing segments. For purposes of following description, the representation with two separate computers is more appropriate although those skilled in the art may implement the inventive principles in any manner which they deem most appropriate for specific applications.

The sine generator in accordance with the invention provides at predetermined equally spaced intervals characterized in the illustrative processing technique by a counter parameter n, and the sine values $y\ (n(t)) = \sin\ ft$ in the form of 16-bit digital signals are provided for a suitably equipped data bus. From these digital signals the desired analog signals are obtained after a digital-analog conversion through reconstruction with a low-pass filter. The y values are obtained from correspondingly selected x values through newly performed computing passes each time whereby the argument values $x(n)$ are selected by computer R1 and supplied to computer R2 which then carries out the calculation of the function values $y(x(n))$.

Since the calculation of the sine values sin ft become increasingly cumbersome with increasing time parameter t, even though the result shows always equal periodic values the argument values $x(n)$ are furnished according to the invention in periodically successive scanning segments so that computer R2 only needs to calculate the sine values of the first half of semiperiod, as described in FIG. 2, between the limits $-90°$ and $90°$ (represented as angles).

Since the sine generator supplies nearly continuously sine values sin ft of all frequencies f, the scanning time points u(t) are however, set from the outset, differing distances or spaces between the argument values $x(n)$ for the different frequencies f result. These distances are according to calculation through a frequency dependent quantization amount $q = 4f/f_s = x(n+1) - x(n)$, if the arguments $x(n+1)$ and $x(n)$ lie within one and the same scanning segments.

As a consequence of the zig-zag or saw tooth function to which the series of argument values x(n) belongs, the quantization amount q is, depending on the scanning segments, alternately positive or negative. At the limit between two scanning segments, however, as shown in FIG. 3 enlarged by comparison with FIG. 2, the sum $(d(n)+d(n+1))$ of the differences between the limit value $g_1$ of the definition range of the argument values x (corresponding to an angle of 90°) and the two argument values x(n) and x(n+1), thus $d(n)=g_1-x(n)$ and $d(n+1)=g_1-x(n+1)$ equal to the quantization amount $q=d(n)+d(n+1)$. When observing this condition, the continuity of the sequene of function values y(x(n)) derived from the arguments x(n) is ensured. In order to keep the sine function to be generated by the sine generator in appropriate phase, an initial value x(0) has to be used for the sequence of the argument values x(n) which can be input into compute R1. For the input of any desired frequency value an input device E is provided.

The desired high digital resolution of the digital signals representing the sine function with minimum computing expenditures is achieved according to the invention on the one hand through a corresponding quantization of the argument values x(n) and on the other hand through an adapted calculation of the function values y(x(n)) through an approximation established on the basis of polynonials. The following rules apply.

To the argument values obtained on the basis of the chosen frequency f and the preset scanning frequency $f_s$ as well as the selected initial value x(0), $x(n)=INT(4f/f_s+x(0)).2^{14}$ which are defined between the upper limit $g_1=2^{14}$ and the lower limit $g_2=-2^{14}$, the sine function values $y(n)=sine(x(n))$ are assigned which are determined on the basis of the following iterative polynomial formation.

By using the coefficient $u_1=INT(x^2).2^{-14}$ and $u_2=INT(x)$ in sequential computations the following polynomials are formed $y_1 \ldots y_5$ the last one of which $y_5=y(n)$ is equal to the searched for output value.

$$y_0 = -142$$

$$y_1 = u_1 \cdot y_0 \cdot 2^{-14} + 2603$$

$$y_2 = u_1 \cdot y_1 \cdot 2^{-14} - 21165$$

$$y_3 = y_2 \cdot 2^{-1}$$

$$y_4 = u_1 \cdot y_3 \cdot 2^{-14} + 25736$$

$$y = y_5 = u_2 \cdot y_4 \cdot 2^{-14}$$

These operations are performed by computer R2, which has the basic structure indicated in FIG. 1. Hereby the argument values x(n) are placed into storage S2 and S3 and from those the values $u_1$ and $u_2$ contained in storage $S_2$ and $S_3$ are calculated. S4 is a register which stores the constants as well as the polynomials $y_1$ to $y_4$ from which the polynomials one after the other sequentially are called up for the purpose of multiplication with the values $u_1$ and $u_2$. Subsequentially, they are temporarily stored in temporary storage AC until calculating of the polynomial $y_5$.

The sine generator in accordance with the invention is not only optimally suited for the generator of 16-bit digital signals but, of course, also for those with lower resolution. It is, however, possible with the same device with further subdivided x- and y-scales with same structured polynomials which differ perhaps by integer multiples of 2 to achieve output values of higher resolution.

There has thus been shown and described a novel high resolution sinusoidal generator which provides a digital signal output and fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

I claim:

1. A digital sinusoidal generator for producing an output of fine resolution digital signals, the generator comprising a first computer for the selection of argument values for a second computer for calculating sine function values y(n), the first computer (R1) including an input device (E) for a frequency f to be generated by the sinusoidal generator which serves to furnish a quantization amount proportional to this frequency $q=INT(4f/f_s) 2^{14}$ wherein $f_s$ is a scanning frequency and that the first computer (R1), whereof an output for providing argument values is coupled to a data input of a memory of said second computer, beginning with a given initial value $x(0)=INT(2\phi/\pi) 2^{14}$, where $\phi$ is a phase angle, yields a series of n argument values (x(n)) differing by the quantization amount lying with the limits $g_1$, $g_2$ of a given argument definition range in periodically sequential scanning segments alternatingly increasing or decreasing, such that a sum $(d(n)+d(n+1))$ of differences (for instance $d(n)=g_1-x(n)$, $d(n+1)=-(g_1-x(n+1))$ between a limit $(g_1)$ and the two argument values x(n), x(n+1) belonging to two different successive scanning segments is equal to the quantization amount (q) and that integer binary increased or decreased (differing by the quantization amount) argument values $x(n)=INT(4f/f_s \cdot n + x(0)) 2^{14}$ are defined between an upper limit $g_1=2^{14}$ and a lower limit $g_2=-2^{14}$ and that obtaining the sine function value $y(n)=(\sin(2\pi(f/f_s) \cdot n + \phi)) 2^{14}$ is intended to be on the basis of the following iterative polynomial formation:

$$y_0 = -142$$

$$y_1 = u_1 \cdot y_0 \cdot 2^{-14} + 2603$$

$$y_2 = u_1 \cdot y_1 \cdot 2^{-14} - 21165$$

$$Y_3 = y_2 \cdot 2^{-1}$$

$$y_4 = u_1 y_3 \cdot 2^{-14} + 25736$$

$$y = y_5 = u_2 \cdot y_4 \cdot 2^{-14}$$

whereby expressions $u_1 = INT(x^2) 2^{-14}$ and $u_2 = INT(x(n))$ are carried.

2. A digital sinusoidal generator for producing an output of fine resolution digital signals, said generator comprising: first and second computers, said first computer being for the selection of argument values x(n) for said second computer and having an output for providing argument values coupled to a data input of a memory of said second computer, said second computer being for calculating sine function values y(n), said first computer including an input device for a frequency f to be generated by said sinusoidal generator, said input device serving to furnish a quantization amount proportional to this frequency $q = \text{INT } (4f/f_s) 2^{14}$ wherein $f_s$ is a scanning frequency, said first computer beginning with a given initial value $x(0) = \text{INT } (2\phi/\pi) 2^{14}$, where $\phi$ is a phase angle, yields a series of n argument values $(x(n))$ differing by said quantization amount lying within limits $g_1$, $g_2$ of a given argument definition range in periodically sequential scanning segments alternatingly increasing or decreasing, such that a sum $(d(n)+d(n+1))$ of differences between a limit and the two argument values $x(n)$, $x(n+1)$ belonging to two different successive scanning segments is equal to said quantization amount; integer binary increased or decreased (differing by the quantization amount) argument values $x(n) = \text{INT } (4f/f_s.n + x(0)) 2^{14}$ are defined between an upper limit $g_1 = 2^{14}$ and a lower limit $g_2 = -2^{14}$ and obtaining the sine function value $y(n) = (-\sin (2\pi(f/f_s).n + \phi)) 2^{14}$ is based on the following iterative polynomial formation:

$$y_0 = -142$$

$$y_1 = u_1.y_0.2^{-14} + 2603$$

$$y_2 = u_1.y_1.2^{-14} - 21165$$

$$Y_3 = y_2.2^{-1}$$

$$y_4 = u_1.y_3.2^{-14} + 25736$$

$$y = y_5 = u_2.y_4.2^{-14},$$

derived expressions $u_1 = \text{INT } (x^2) 2^{-14}$ and $u_2 = \text{INT } (x(n))$ being carried.

* * * * *